US011144785B2

(12) United States Patent
Chapados et al.

(10) Patent No.: US 11,144,785 B2
(45) Date of Patent: Oct. 12, 2021

(54) METHOD AND SYSTEM FOR PROCESSING A TASK WITH ROBUSTNESS TO MISSING INPUT INFORMATION

(71) Applicant: IMAGIA CYBERNETICS INC., Montréal (CA)

(72) Inventors: Nicolas Chapados, Montréal (CA); Nicolas Guizard, Montréal (CA); Mohammad Havaei, Sherbrooke (CA); Yoshua Bengio, Montréal (CA)

(73) Assignee: IMAGIA CYBERNETICS INC., Montréal (CA)

( * ) Notice: Subject to any disclaimer, the term of this patent is extended or adjusted under 35 U.S.C. 154(b) by 105 days.

(21) Appl. No.: 16/085,339

(22) PCT Filed: Mar. 17, 2017

(86) PCT No.: PCT/IB2017/051580
§ 371 (c)(1),
(2) Date: Sep. 14, 2018

(87) PCT Pub. No.: WO2017/158575
PCT Pub. Date: Sep. 21, 2017

(65) Prior Publication Data
US 2019/0073563 A1 Mar. 7, 2019

Related U.S. Application Data

(60) Provisional application No. 62/309,682, filed on Mar. 17, 2016.

(51) Int. Cl.
*G06K 9/00* (2006.01)
*G06K 9/62* (2006.01)
(Continued)

(52) U.S. Cl.
CPC ......... *G06K 9/6256* (2013.01); *G06K 9/4628* (2013.01); *G06K 9/629* (2013.01);
(Continued)

(58) Field of Classification Search
CPC ....... G05B 2219/33039; G06K 9/6262; G06K 9/6267; G06K 2209/05; G06T 2207/20081; G06T 7/0012
See application file for complete search history.

(56) References Cited

U.S. PATENT DOCUMENTS 6,658,287 B1   12/2003  Litt et al.
2003/0004966 A1 *  1/2003  Bolle ................... G06F 16/735
(Continued)

FOREIGN PATENT DOCUMENTS

WO    WO 2015/010745 A1    1/2015

OTHER PUBLICATIONS

Iglesias et al., "Multi-Atlas Segmentation of Biomedial Images: A Survey", Med Image Anal. 2015, vol. 24, Iss. 1, pp. 205-219, Aug. 31, 2015. Retrieved online: https://www.ncbi.nlm.nih.gov/pmc/articles/PMC4532640/.
(Continued)

Primary Examiner — Guillermo M Rivera-Martinez
(74) Attorney, Agent, or Firm — Pearl Cohen Zedek Latzer Baratz LLP

(57) ABSTRACT

A unit is disclosed for generating combined feature maps in accordance with a processing task to be performed, the unit comprising a feature map generating unit for receiving more than one modality and for generating more than one corresponding feature map using more than one corresponding transformation; wherein the generating of each of the more than one corresponding feature map is performed by applying a given corresponding transformation on a given corresponding modality, wherein the more than one correspond-
(Continued)

ing transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map.

13 Claims, 4 Drawing Sheets

(51) Int. Cl.
| | | |
|---|---|---|
| *G06K 9/46* | (2006.01) | |
| *G06N 3/04* | (2006.01) | |
| *G06T 7/11* | (2017.01) | |
| *G06N 3/08* | (2006.01) | |
| *G06N 20/00* | (2019.01) | |
| *G06T 7/10* | (2017.01) | |
| *G06T 7/00* | (2017.01) | |

(52) U.S. Cl.
CPC ......... *G06K 9/6261* (2013.01); *G06K 9/6271* (2013.01); *G06N 3/0454* (2013.01); *G06N 3/0481* (2013.01); *G06N 3/082* (2013.01); *G06N 3/084* (2013.01); *G06N 20/00* (2019.01); *G06T 7/10* (2017.01); *G06T 7/11* (2017.01); *G06T 7/0012* (2013.01); *G06T 2207/20081* (2013.01)

(56) References Cited

U.S. PATENT DOCUMENTS

| | | | | |
|---|---|---|---|---|
| 2010/0272338 A1* | 10/2010 | Agnihotri | .............. | G16H 50/70 382/131 |
| 2011/0026849 A1* | 2/2011 | Kameyama | ........ | G06K 9/00308 382/260 |
| 2011/0255802 A1* | 10/2011 | Kameyama | ........ | G06K 9/00275 382/278 |
| 2014/0201126 A1* | 7/2014 | Zadeh | .................... | A61B 5/165 706/52 |
| 2015/0199010 A1* | 7/2015 | Coleman | .............. | A61B 5/0006 345/156 |
| 2015/0217449 A1* | 8/2015 | Meier | .................... | B25J 9/1602 700/257 |
| 2015/0294194 A1* | 10/2015 | Znaidai | .................. | G06F 16/40 382/190 |
| 2016/0034809 A1* | 2/2016 | Trenholm | ................. | G06F 8/35 706/20 |
| 2016/0086050 A1* | 3/2016 | Piekniewski | ............. | G06T 7/20 382/103 |
| 2016/0174902 A1* | 6/2016 | Georgescu | ........... | A61B 5/7267 600/408 |
| 2016/0210552 A1* | 7/2016 | Kasabov | ................ | G06N 3/088 |
| 2016/0217567 A1* | 7/2016 | Keuchel | .................... | G06T 7/11 |
| 2017/0046839 A1* | 2/2017 | Paik | .................... | G06K 9/00147 |
| 2017/0098153 A1* | 4/2017 | Mao | ...................... | G06N 3/0454 |
| 2018/0205793 A1* | 7/2018 | Loeb | ..................... | G06T 19/003 |
| 2019/0236394 A1* | 8/2019 | Price | .................... | G06K 9/4628 |

OTHER PUBLICATIONS

International Search Report of PCT Patent Application No. PCT/IB2017/051580, dated Jun. 19, 2017.

Guizard, N. et al., "Rotation-invariant multi-contrast non-local means for ms lesion segmentation." NeuroImage: Clinical, vol. 8, pp. 376-389 (2015).

Cordier, N. et al., "A patch-based approach for the segmentation of pathologies: Application to glioma labelling." IEEE Transaction on Medical Imaging, vol. 35, No. 4, pp. 1066-1076 (Apr. 2016).

Geremia, E., et al., "Spatially adaptive random forests", 2013 IEEE 10th Annual International Symposium on Biomedical Imaging, pp. 1344-1347 (Apr. 2013).

Brosch, T., et al., "Deep Convolutional Encoder Networks for Multiple Sclerosis Lesion Segmentation", Medical Image Computing and Computer-Assisted Intervention, MICCAI 2015: 18th International Conference, Munich, Germany, Oct. 5-9, 2015, Proceedings, Part III, chap. pp. 3-11. Springer International Publishing, Cham (2015).

Van Buuren, S. "Flexible imputation of missing data." CRC press (2012).

Hofmann, M. et al., "MRI-based attenuation correction for PET/MRI: a novel approach combining pattern recognition and atlas registration." Journal of Nuclear Medicine, vol. 49, No. 11, pp. 1875-1883 (2008).

Tulder, G. et al. "Why Does Synthesized Data Improve Multi-sequence Classification?", Medical Image Computing and Computer-Assisted Intervention. MICCAI 2015: 18th International Conference, Munich, Germany, Oct. 5-9, 2015, Proceedings, Part I, chap. pp. 531-538. Springer International Publishing, Cham (2015).

Hor, S. et al. Scandent tree: A random forest learning method for incomplete multimodal datasets. In: Medical Image Computing and Computer-Assisted Intervention—MICCAI 2015, pp. 694-701. Springer (2015).

Goodfellow, I., et al., "Deep Learning", http://goodfeli.github.io/dlbook/, book in preparation for MIT Press (This book is available online on a chapter-by-chapter basis at http://www.deeplearningbook.org/) (2016).

Vinitski, Simon, et al. "Fast Tissue Segmentation Based on a 4D Feature Map in Characterization of Intracranial Lesions." Journal of Magnetic Resonance Imaging, vol. 9, No. 6, 1999, pp. 768-776. (1999).

Neverova, Natalia et al. "ModDrop: Adaptive Multi-Modal Gesture Recognition", arXiv, Jun. 6, 2015. pp. 1-14.

Search report for European Patent Application No. 17765968.7, dated Oct. 4, 2019.

\* cited by examiner

METHOD AND SYSTEM FOR PROCESSING A TASK WITH ROBUSTNESS TO MISSING INPUT INFORMATION

CROSS-REFERENCE TO RELATED APPLICATION

The present patent application is a National Phase Application of PCT International Application No. PCT/IB2017051580, International Filing Date Mar. 17, 2017, which claims priority of U.S. Provisional Patent Application No. 62/309,682, filed on Mar. 17, 2016, of which is incorporated herein by reference.

FIELD

The invention relates to data processing. More precisely, this invention relates to a method and system for processing a task with robustness to missing input information.

BACKGROUND

In medical image analysis, image processing such as image segmentation is an important task and is primordial to visualizing and quantifying the severity of the pathology in clinical practices. Multi-modality imaging provides complementary information to discriminate specific tissues, anatomy and pathologies. However, manual segmentation is long, painstaking and subject to human variability. In the last decades, numerous segmentation approaches have been developed to automate medical image segmentation.

These methods can be grouped into two categories, multi-atlas and model-based.

The multi-atlas approaches estimate online intensity similarities between the subject being segmented and multi-atlases or images with expert labels. These multi-atlas techniques have shown excellent results in structural segmentation when using non-linear registration [Iglesias, J. E., Sabuncu, M. R.: Multi-atlas segmentation of biomedical images: A survey. Medical image analysis 24(1), 205-219 (2015)]; when combined with non-local approaches they have proven effective in segmenting diffuse and sparse pathologies (i.e., multiple sclerosis (MS) lesions [Guizard, N., Coupé, P., Fonov, V. S., Manjón, J. V., Arnold, D. L., Collins, D. L.: Rotation-invariant multi-contrast non-local means for ms lesion segmentation. NeuroImage: Clinical 8, 376-389 (2015)]) as well as more complex multi-label pathology (i.e., Glioblastoma [Cordier, N., Delingette, H., Ayache, N.: A patch-based approach for the segmentation of pathologies: Application to glioma labelling. IEEE Transactions on Medical Imaging PP(99), 1-1 (2016)]). Multi-atlas methods rely on image intensity and spatial similarity, which can be difficult to be fully described by the atlases and heavily dependent on the image pre-processing.

Model-based approaches, in contrast, are typically trained offline to identify a discriminative model of image intensity features. These features can be predefined by the user (e.g., within random decision forest (RDF) [Geremia, E., Menze, B. H., Ayache, N.: Spatially adaptive random forests pp. 1344-1347 (2013)]) or automatically extracted and learned hierarchically directly from the images [Brosch, T., Yoo, Y., Tang, L. Y. W., Li, D. K. B., Traboulsee, A., Tam, R.: Medical Image Computing and Computer-Assisted Intervention—MICCAI 2015: 18th International Conference, Munich, Germany, Oct. 5-9, 2015, Proceedings, Part III, chap. Deep Convolutional Encoder Networks for Multiple Sclerosis Lesion Segmentation, pp. 3-11. Springer International Publishing, Cham (2015)].

Both strategies are typically optimized for a specific set of multi-modal images and usually require these modalities to be available. In clinical settings, image acquisition and patient artifacts, among other hurdles, make it difficult to fully exploit all the modalities; as such, it is common to have one or more modalities to be missing for a given instance. This problem is not new, and the subject of missing data analysis has spawned an immense literature in statistics (e.g., [Van Buuren, S.: Flexible imputation of missing data. CRC press (2012)]). In medical imaging, a number of approaches have been proposed, some of which require retraining a specific model with the missing modalities or synthesizing them [Hofmann, M., Steinke, F., Scheel, V., Charpiat, G., Farquhar, J., Aschoff, P., Brady, M., Schölkopf, B., Pichler, B. J.: MRI-based attenuation correction for PET/MRI: a novel approach combining pattern recognition and atlas registration. Journal of Nuclear Medicine 49(11), 1875-1883 (2008)]. Synthesis can improve multi-modal classification by adding information of the missing modalities in the context of simple classifier (e.g., RDF) [Tulder, G., Bruijne, M.: Medical Image Computing and Computer-Assisted Intervention—MICCAI 2015: 18th International Conference, Munich, Germany, Oct. 5-9, 2015, Proceedings, Part I, chap. Why Does Synthesized Data Improve Multi-sequence Classification?, pp. 531-538. Springer International Publishing, Cham (2015)]. Approaches to mimicking with partial features a classifier trained with a complete set of features have also been proposed [Hor, S., Moradi, M.: Scandent tree: A random forest learning method for incomplete multimodal datasets. In: Medical Image Computing and Computer-Assisted Intervention—MICCAI 2015, pp. 694-701. Springer (2015)].

Typical convolutional neural network (CNN) architectures take a multiplane image as input and process it through a sequence of convolutional layers (followed by nonlinearities such as ReLU(•)=max(0, •)), alternating with optional pooling layers, to yield a per-pixel or per-image output [Goodfellow, I., Bengio, Y., Courville, A.: Deep Learning (© 2016 The MIT Press). In such networks, every input plane is assumed to be present within a given instance: since the very first convolutional layer mixes input values coming from all planes, any missing plane introduces a bias in the computation that the network is not equipped to deal with.

There is therefore a need for a method and system that will overcome at least one of the above-identified drawbacks.

Features of the invention will be apparent from review of the disclosure, drawings and description of the invention below.

BRIEF SUMMARY

According to a broad aspect, there is disclosed a unit for generating a vector of at least one numeric value to be used for processing a task, the unit for generating a vector comprising a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map; a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the processing task to be performed and a feature map processing unit for receiving the generated at least one final feature map from the second feature map generating unit and for processing the generated at least one final feature map to provide a generated vector of at least one numeric value to be used for processing the task.

In accordance with an embodiment, the initial training is performed according to a pseudo-curriculum learning scheme wherein after a few iterations where all modalities are presented, modalities are randomly dropped.

In accordance with an embodiment, each of the more than one corresponding transformation comprises a machine learning model composed of at least a plurality of levels of non-linear operations.

In accordance with an embodiment, each of the more than one corresponding transformation comprises more than one layer of convolutional neural networks followed by fully connected layers.

In accordance with an embodiment, each of the generated more than one corresponding feature map is represented using one of a polynomial, a radial basis function, and a sigmoid kernel.

In accordance with an embodiment, the processing task to be performed comprises an image processing task selected from a group consisting of an image segmentation, an image classification, an image detection, a pixel-wise classification and a detection of patches in images.

In accordance with an embodiment, each of the at least one corresponding transformation of the second feature map generating unit comprises a machine learning model composed of at least one level of at least one of a non-linear operation and a linear operation.

According to a broad aspect, there is disclosed a non-transitory computer-readable storage medium for storing computer-executable instructions which, when executed, cause a processing device to perform a method for processing a task, the method comprising providing a unit for generating a vector of at least one numeric value to be used for processing a task, the unit for generating a vector of at least one numeric value to be used for processing a task comprising a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined featured maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed, and a feature map processing unit for receiving the generated at least one final feature map from the second feature map generating unit and for processing the generated at least one final feature map to provide a generated vector of at least one numeric value to be used for processing the task; training the unit for generating combined feature maps and the second feature map generating unit using training data; providing at least one modality to the unit for generating a vector of at least one numeric value to be used for processing a task; and obtaining a corresponding vector of at least one numeric value.

According to a broad aspect, there is disclosed a non-transitory computer-readable storage medium for storing computer-executable instructions which, when executed, cause a processing device to perform a method for performing a task, the method comprising providing a trained unit for generating a vector of at least one numeric value to be used for processing a task, the unit for generating a vector of at least one numeric value to be used for processing a task comprising a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with a t least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed and a feature map processing unit for receiving the generated at least one final feature map from the second feature map generating unit and for processing the generated at least one final feature map to provide a generated vector of at least one numeric value to be used for processing the task; providing at least one modality to the trained unit for generating a vector of at least one numeric value to be used for processing the task; obtaining a corresponding vector of at least one numeric value.

According to a broad aspect, there is disclosed a processing device comprising a central processing unit; a display device; a communication port for operatively connecting the processing device to a plurality of mobile processing devices, each carried by a user; a memory unit comprising an application for processing a task, the application comprising instructions for providing a unit for generating a vector of at least one numeric value to be used for processing a task, the unit for generating a vector of at least one numeric value to be used for processing a task comprising a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed; and a feature map processing unit for receiving the generated at least one final feature map from the second feature map generating unit and for processing the generated at least one final feature map to provide a generated a vector of at least one numeric value to be used for processing the task; instructions for training the unit for generating combined feature maps and the second feature map generating unit using training data; instructions for providing at least one modality to the unit for generating a vector of at least one numeric value to be used for processing the task and instructions for obtaining a corresponding vector of at least one numeric value. According to a broad aspect, there is disclosed a method for processing a plurality of modalities, wherein the processing is robust to an absence of at least one modality, the method comprising receiving a plurality of modalities; processing each modality of the plurality of modalities using a respective transformation to generate a respective feature map comprising at least one corresponding numeric value, wherein the respective transformation operates independently of each other, further wherein the respective transformation comprises a machine learning model composed of at least a plurality of levels of non-linear operations; processing the numeric values obtained using at least one combining operation to generate at least one combined representation of the numeric values obtained, wherein the at least one combining operation comprises a computation that reduces each corresponding numeric value of each of the more than one feature maps generated down to a numeric value in the at least one combined representation of the numeric values obtained and processing the at least one combined representation of the numeric values obtained using a machine learning model composed of at least one level of at least one of a nonlinear operation and a linear operation for performing the processing of the plurality of modalities.

According to a broad aspect, there is disclosed a unit for generating combined feature maps in accordance with a processing task to be performed, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map.

According to one embodiment, the combining of the corresponding more than one feature map generated by the feature map generating unit is performing in accordance with more than one combining operation; wherein each combining operation is independent from one another.

According to a broad aspect, there is disclosed a segmentation unit for generating a segmentation mask of an image, the segmentation unit comprising a first group of kernels comprising at least one layer of kernels, each layer comprising more than one set of a plurality of convolution kernels to be trained; each set for receiving a specific modality of the image and for generating a plurality of corresponding feature maps; a combining unit for combining, for each convolution kernel to be trained of the plurality of convolution kernels to be trained, each feature map generated by a given convolution kernel to be trained in each set of the more than one set a plurality of convolution kernels to be trained to thereby provide a plurality of corresponding combined feature maps; a second group of kernels comprising at least one layer of kernels, each layer comprising a set of a plurality of convolution kernels to be trained; each set of a plurality of convolution kernels to be trained for receiving a corresponding combined feature map generated by the combining unit and for generating a plurality of feature maps and a feature map processing unit for receiving the plurality of generated feature maps from the second group of convolution kernels and for processing the plurality of generated feature maps to provide the segmentation mask of the image.

According to another broad aspect, there is disclosed a non-transitory computer-readable storage medium for storing computer-executable instructions which, when executed, cause a processing device to perform a method for segmenting an image, the method comprising providing a segmentation unit for generating a segmentation mask of an image, the segmentation unit comprising a first group of convolution kernels comprising at least one layer of convolution kernels, each layer comprising more than one set of a plurality of convolution kernels to be trained; each set for receiving a specific modality of the image and for generating a plurality of corresponding feature maps; a combining unit for combining, for each convolution kernel to be trained of the plurality of convolution kernels to be trained, each feature map generated by a given convolution kernel to be trained in each set of the more than one set a plurality of convolution kernels to be trained to thereby provide a plurality of corresponding combined feature maps; a second group of convolution kernels comprising at least one layer of convolution kernels, each layer comprising a set of a plurality of convolution kernels to be trained; each set of a plurality of convolution kernels to be trained for receiving a corresponding combined feature map generated by the combining unit and for generating a plurality of feature maps; and a feature map processing unit for receiving the plurality of generated feature maps from the second group of convolution kernels and for processing the plurality of generated feature maps to provide the segmentation mask of the image; training each convolution kernel using training data; providing at least one modality of the image to segment to the segmentation and providing a corresponding segmentation mask of the image.

According to another broad aspect, there is disclosed a non-transitory computer-readable storage medium for storing computer-executable instructions which, when executed, cause a processing device to perform a method for segmenting an image, the method comprising providing a trained segmentation unit for generating a segmentation mask of an image, the segmentation unit comprising a first group of convolution kernels comprising at least one layer of convolution kernels, each layer comprising more than one set of a plurality of convolution kernels; each set for receiving a specific modality of the image and for generating a plurality of corresponding feature maps; a combining unit for combining, for each convolution kernel of the plurality of convolution kernels, each feature map generated by a given convolution kernel in each set of the more than one set a plurality of convolution kernels to thereby provide a plurality of corresponding combined feature maps; a second group of convolution kernels comprising at least one layer of convolution kernels, each layer comprising a set of a plurality of convolution kernels; each set of a plurality of convolution kernels for receiving a corresponding combined feature map generated by the combining unit and for generating a plurality of feature maps and a feature map processing unit for receiving the plurality of generated feature maps from the second group of convolution kernels and for processing the plurality of generated feature maps to provide the segmentation mask of the image; providing at least one modality of the image to segment to the segmentation and providing a corresponding segmentation mask of the image.

According to another broad aspect, there is disclosed a processing device comprising a central processing unit; a display device; a communication port for operatively connecting the processing device to a plurality of mobile processing devices, each carried by a user; a memory unit comprising an application for performing a segmentation of an image, the application comprising instructions for providing a segmentation unit for generating a segmentation mask of an image, the segmentation unit comprising a first group of convolution kernels comprising at least one layer of convolution kernels, each layer comprising more than one set of a plurality of convolution kernels to be trained; each set for receiving a specific modality of the image and for generating a plurality of corresponding feature maps; a combining unit for combining, for each convolution kernel to be trained of the plurality of convolution kernels to be trained, each feature map generated by a given convolution kernel to be trained in each set of the more than one set a plurality of convolution kernels to be trained to thereby provide a plurality of corresponding combined feature maps; a second group of convolution kernels comprising at least one layer of convolution kernels, each layer comprising a set of a plurality of convolution kernels to be trained; each set of a plurality of convolution kernels to be trained for receiving a corresponding combined feature map generated by the combining unit and for generating a plurality of feature maps and a feature map processing unit for receiving the plurality of generated feature maps from the second group of convolution kernels and for processing the plurality of generated feature maps to provide the segmentation mask of the image; instructions for training each convolution kernel of the segmentation unit using training data; instructions for providing at least one modality of the image to segment to the segmentation and instructions for providing a corresponding segmentation mask of the image.

An advantage of the method for processing a plurality of modalities disclosed herein is that it is robust to any combinatorial subset of available modalities provided as input without the need to learn a combinatorial number of imputation models.

Another advantage of the method for processing a plurality of modalities disclosed herein is that it is robust to any subset of missing modalities.

Another advantage of the method for processing a plurality of modalities disclosed herein is that it takes advantage of several modalities, that may be instance varying.

Another advantage of the method for processing a plurality of modalities disclosed herein is that it does not require a "least common denominator" modality that absolutely must be present for every instance.

BRIEF DESCRIPTION OF THE DRAWINGS

In order that the invention may be readily understood, embodiments of the invention are illustrated by way of example in the accompanying drawings.

Figure 1:
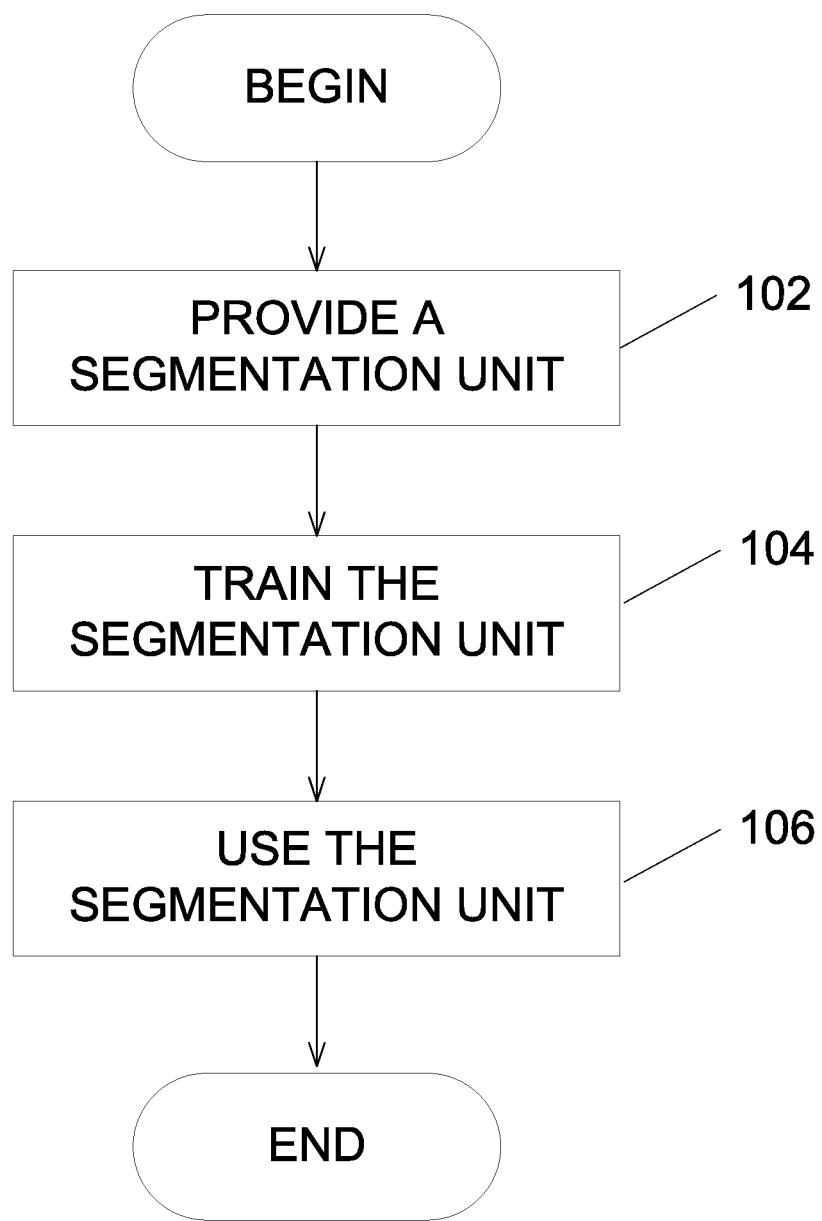
FIG. 1 is a flowchart that shows an embodiment of a method for segmenting an image which is an embodiment of a method for processing a task, wherein the processing of the task comprises image segmentation.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "multimodal dataset" and like terms mean a dataset for which each instance is composed of data having different modalities (or types). For example, in medical imaging, a multimodal dataset consists of having different imaging modalities simultaneously for each patient instance, such as computed tomography (CT), ultrasound or various kinds of magnetic resonance (MR) images.

The term "processing task" means applying a trained machine learning model on a given set of data, wherein a machine learning task depends on the nature of a learning "signal" or "feedback" available to a learning algorithm during a training, on a set of modalities pertinent for the given set of data. Non limiting examples of "processing task" in healthcare comprise image segmentation, image classification, pixel-wise classification, detection of patches in images, classification of patches in images, stratifying patients, identifying radiomic phenotype relating to biodistribution, target occupancy, pharmacodynamics effects, tumor heterogeneity and predicting treatment response, from multiple modalities.

The term "modality" means any of the various types of equipment or probes used to acquire information, directly or indirectly, of relevant object or phenomenon for the task to be performed. Non limiting examples of "modality" in healthcare comprise radiography imaging, ultrasound imaging, magnetic resonance imaging, genetic testing, pathology testing and biosensors.

The term "feature map" means the result of applying a function to a topologically arranged vector of numbers to obtain a vector of corresponding output numbers preserving a topology. Non limiting example of a "feature map" is the result of using a layer of convolutional neural network mapping input features to hidden units to form new features to be fed to the next layer of convolutional neural network.

The term "training" means the process of training a machine learning model providing a machine learning algorithm with a set of modalities to learn from, wherein the set of modalities contains a target attribute, and further wherein the machine learning model finds patterns in the set of modalities that map input data attributes to a target or task attribute. "Training" outputs a machine learning model that captures these patterns. Non limiting examples of "training" comprise supervised training, unsupervised training and curriculum training specifically in the context of non-convex training criteria.

The term "combining operation" means a calculation between numbers, from zero or more input operands to an output values. Non limiting examples of "combining operation" are arithmetic and higher arithmetic operations.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Now referring to FIG. 1, there is shown an embodiment of a method for segmenting an image.

It will be appreciated by the skilled addressee that the segmenting of an image is one embodiment of a processing task to be performed. In an alternative embodiment, the image processing task is one of an image classification, an image detection, a pixel-wise classification and a detection of patches in images. In an alternative embodiment, the processing task to be performed comprises a treatment response prediction from multiple modalities.

According to processing step 102, a segmentation unit is provided.

It will be appreciated that the segmentation unit is an embodiment of a unit for generating a vector of at least one numeric value to be used for processing a task, wherein the processing of the task comprises image segmentation.

It will be appreciated that the segmentation unit disclosed herein is used to segment images having any subset of modality, i.e. images having incomplete multi-modal datasets.

In one embodiment, the images are medical images.

The skilled addressee will appreciate that various alternative embodiments may be provided for the images.

More precisely and as further explained below, the segmentation unit disclosed herein uses a deep learning framework to achieve the purpose of segmenting images having any subset of modality.

As disclosed below, each modality is initially processed by its own convolutional pipeline, independently of all others. After at least one independent stage, feature maps from all available modalities are merged by computing map-wise statistics, such as the mean and the variance, whose expectation do not depend on the number of terms (i.e., modalities) that are provided. After merging, the mean and variance feature maps are concatenated and fed into a final set of convolutional stages to obtain network output.

It will therefore be appreciated that, in the method disclosed herein, each modality contributes an independent term to the mean and variance; in contrast to a prior-art vanilla convolutional neural network architecture, a missing modality does not throw the computation off: The mean and variance terms simply become estimated with wider standard errors.

Figure 2:
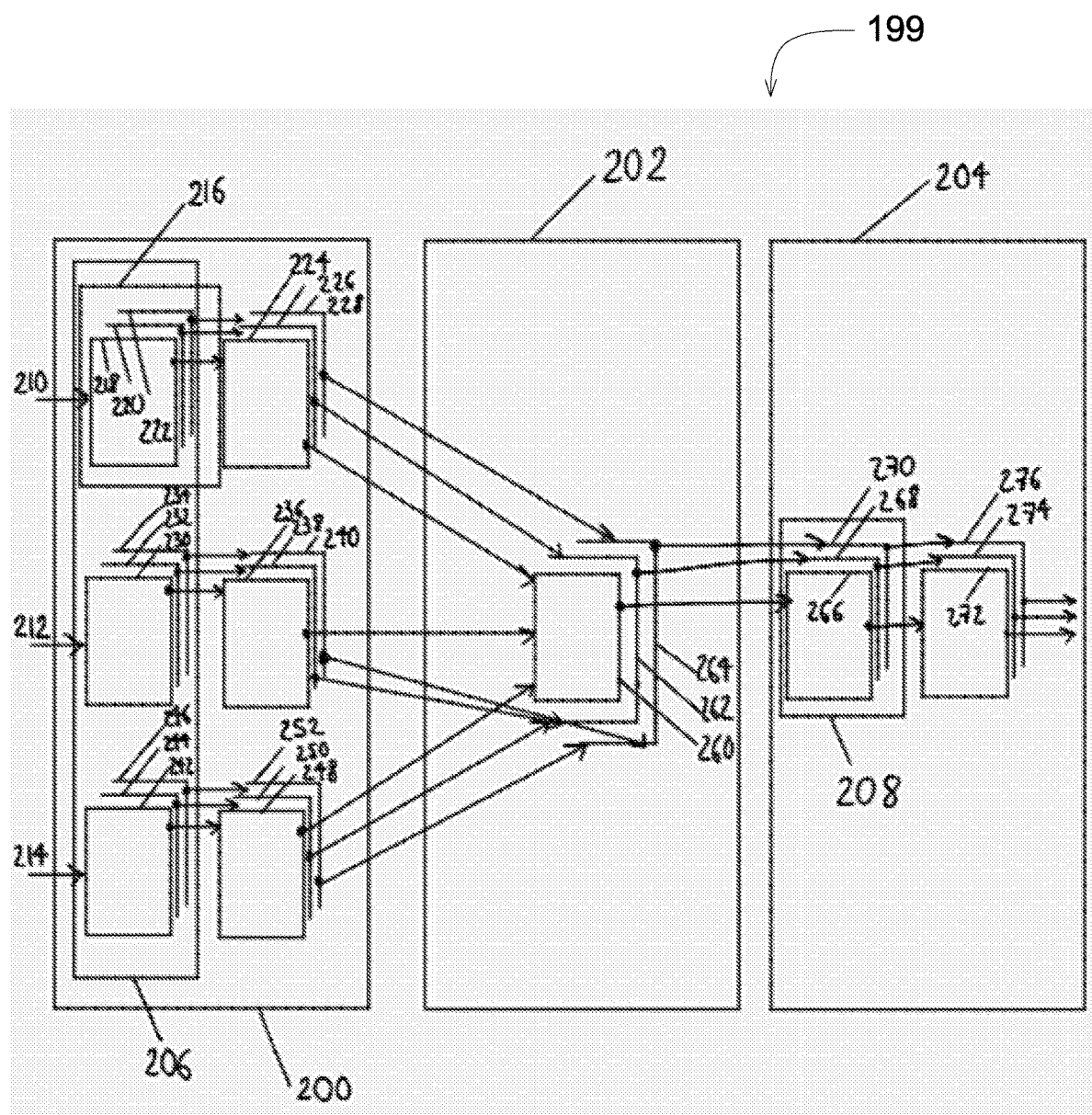
FIG. 2 is a block diagram that shows a first embodiment of a segmentation unit used in a method for segmenting an image. It will be appreciated that the segmentation unit is an embodiment of a unit for generating a vector of at least one numeric value to be used for processing a task, wherein the processing of the task comprises image segmentation.

Now referring to FIG. 2, there is shown a first embodiment of a segmentation unit 199 for generating a segmentation mask of an image.

It will be appreciated that the first group of convolution kernels 200 is an embodiment of a feature map generating unit. The feature map generating unit is used for receiving more than one modality and for generating more than one corresponding feature map using more than one corresponding transformation operating independently of each other. It will be appreciated that the generating of each of the more than one corresponding feature map is performed by applying a given corresponding transformation on a given corresponding modality. It will be further appreciated that the more than one corresponding transformation is generated following an initial training performed in accordance with the processing task to be performed. As further explained below, the initial training is performed according to a pseudo-curriculum learning scheme wherein after a few iterations where all modalities are presented, modalities are randomly dropped.

More precisely, and still referring to FIG. 2, the segmentation unit 199 comprises a first group of convolution kernels 200.

The first group of convolution kernels comprises at least one layer of convolution kernels 206.

It will be appreciated that each layer of convolution kernels comprises more than one set of a plurality of convolution kernels to be trained.

More precisely, each set of a plurality of convolution kernels to be trained is for receiving a specific modality of the image and for generating a plurality of corresponding feature maps.

In the embodiment of FIG. 2, the first group of convolution kernels 200 comprises a first layer of convolution kernels 206.

The first layer of kernels 206 comprises a first set of convolution kernels 216. Still referring to FIG. 2, the first set of convolution kernels 216 comprises convolution kernel 218, convolution kernel 220, . . . and convolution kernel 222.

It will be appreciated that each of the convolution kernel 218, the convolution kernel 220 and the convolution kernel 222 receives a given modality 210 of an image.

A corresponding plurality of feature maps are generated. More precisely, feature map 224 is the result of the convolution of the given modality 210 of the image by the convolution kernel 218, while feature map 226 is the result of the convolution of the given modality 210 of the image by the convolution kernel 220, and feature map 228 is the result of the convolution of the given modality 210 of the image by the convolution kernel 222.

Similarly, feature map 236 is the result of the convolution of the given modality 212 of the image by the convolution kernel 230, while feature map 238 is the result of the convolution of the given modality 212 of the image by the convolution kernel 232, and feature map 240 is the result of the convolution of the given modality 212 of the image by the convolution kernel 234.

The second modality of the image is therefore convolved individually with each of the convolution kernels 230, 232 and 234.

Similarly, feature map 248 is the result of the convolution of the given modality 214 of the image by the convolution kernel 242, while feature map 250 is the result of the convolution of the given modality 214 of the image by the convolution kernel 244, and feature map 252 is the result of the convolution of the given modality 214 of the image by the convolution kernel 246.

The third modality of the image is therefore convolved individually with each of the convolution kernels 242, 244 and 246.

At this point it should be appreciated that, while an embodiment has been disclosed with three modalities of an image, the skilled addressee will appreciate that any number of modalities greater than or equal to two may be used.

It should also be appreciated that, while in one embodiment three modalities of the image may be available, any combination of one or more modality may be used as an input.

For instance, in one embodiment, only modality 210 is available. In an alternative embodiment, only modalities 214 and 210 are available, etc.

Still referring to FIG. 2, it will be appreciated that the segmentation unit 199 further comprises a combining unit 202.

It will be appreciated that the combining unit 202 is an embodiment of a combining unit for selecting and combining the corresponding more than one feature map generated by the feature map generating unit in accordance with at least one combining operation and for providing at least one corresponding combined feature map. Moreover, it will be appreciated that the combining unit is operating in accordance with the processing task to be performed and the combining operation reduces each corresponding numeric value of each of the more than one feature map generated by the feature map generation unit down to one numeric value in the at least one corresponding combined feature map.

It will be appreciated that in one embodiment, the combining of the corresponding more than one feature map generated by the feature map generating unit is performing in accordance with more than one combining operation. It will be appreciated that in one embodiment, wherein more than one combining operation is used, each combining operation is independent from one another.

More precisely and in the embodiment shown in FIG. 2, the combining unit 202 is used for combining, for each convolution kernel to be trained of the plurality of convolution kernels to be trained, each feature map generated by a given convolution kernel to be trained in each set of the more than one set of a plurality of convolution kernels to be trained to thereby provide a plurality of corresponding combined feature maps.

More precisely, in the combining unit 202, a feature map 260 is generated as a result of the combination of feature map 224 with feature map 236 and with feature map 248.

In the combining unit 202, feature map 262 is generated as a result of the combination of feature map 226 with feature map 238 and with feature map 250.

In the combining unit 202, feature map 264 is generated as a result of the combination of feature map 228 with feature map 240 and with feature map 252.

It will be appreciated that the combination of the feature maps may be performed according to various embodiments.

For instance the combination may be selected from a group consisting of a computation of a mean, a computation of a variance and a computation of higher-order statistics such as the skewness or kurtosis, as well as computation of quantile statistics, as well as any computation that reduces an unordered non-empty set of numbers down to one number. In fact and as mentioned above, the combination is performed using a combining operation which reduces each corresponding numeric value of each of the more than one feature map generated by the feature map generation unit down to one numeric value in the at least one corresponding combined feature map.

It will be appreciated by the skilled addressee that the purpose of the combination is to create an abstraction layer.

In one embodiment, not shown in FIG. 2, two distinct combinations are performed. A first combination performed is a mean while a second combination performed is a variance. Each distinct combination is responsible for generating a corresponding feature map.

Still referring to FIG. 2, the segmentation unit 199 further comprises a second group of convolution kernels 204.

The second group of convolution kernels 204 comprises at least one layer of convolution kernels.

It will be appreciated that the second group of convolution kernels is an embodiment of a second feature map generating unit. The second feature map generating unit is used for receiving the at least one corresponding combined feature map from the unit for generating combined feature maps and for generating at least one final feature map using at least one corresponding transformation. It will be further appreciated that the generating of the at least one final feature map is performed by applying each of the at least one corresponding transformation on at least one of the at least one corresponding feature map received from the unit for generating combined feature maps. Moreover, it will be appreciated that the at least one corresponding transformation is generated following an initial training performed in accordance with the processing task to be performed.

More precisely and in the embodiment disclosed in FIG. 2, each layer of convolution kernels comprises a plurality of convolution kernels to be trained. Each convolution kernel to be trained is used for receiving a corresponding combined feature map generated by the combining unit and for generating the segmentation mask of the image.

More precisely and in the embodiment shown in FIG. 2, the second group of kernels comprises a single layer of convolution kernels 208.

The layer of convolution kernels 208 comprises convolution kernel 266, convolution kernel 268, . . . and convolution kernel 270.

It will be appreciated that a feature map is convolved with a given kernel to generate a new feature map.

For instance, the feature map 260 is convolved with convolution kernel 266 to generate feature map 272.

Similarly, the feature map 262 is convolved with convolution kernel 268 to generate feature map 274.

The feature map 264 is convolved with convolution kernel 270 to generate feature map 276.

It will be appreciated that the segmentation unit 199 further comprises a feature map processing unit, not shown in FIG. 2.

The feature map processing unit is used for receiving the generated at least one final feature map from the second feature map generating unit and for processing the generated at least one final feature map to provide a generated vector of at least one numeric value to be used for processing the task.

In the embodiment disclosed in FIG. 2, the generated vector of at least one numeric value comprises the segmentation mask of the image.

More precisely and in the embodiment disclosed in FIG. 2, the feature map processing unit receives the feature map 272, the feature map 274 and the feature map 276 and generates a corresponding segmentation mask.

It will be appreciated that the segmentation mask is generated using a "softmax" computation across the feature maps.

It will be appreciated by the skilled addressee that various alternative embodiments may be provided.

Figure 3:
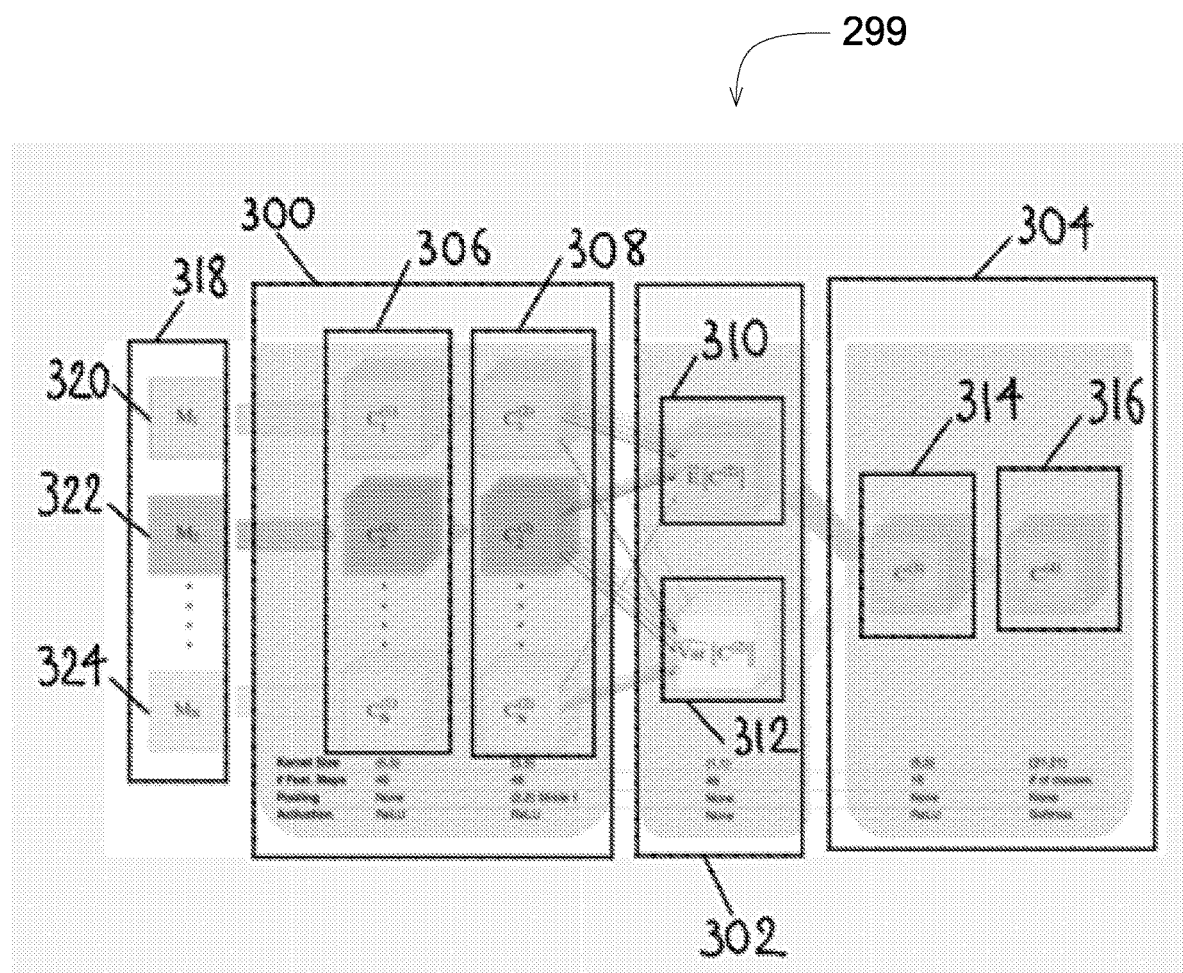
FIG. 3 is a block diagram that shows a second embodiment of a segmentation unit used in a method for segmenting an image.

Now referring to FIG. 3, there is shown a second embodiment of a segmentation unit 299 for generating a segmentation mask of an image.

In this embodiment, the segmentation unit 299 comprises a first group of convolution kernels 300, a combining unit 302, a second group of convolution kernels 304 and a feature map processing unit, not shown in FIG. 3.

The first group of convolution kernels 300 comprises two layers of convolution kernels, not shown, generating respectively more than one set of a plurality of feature maps. A first set of feature maps 306 and a second set of feature maps 308 are disclosed in FIG. 3.

It will be appreciated that the two layers of convolution kernels are referred to as respectively $C_k^{(1)}$ and $C_k^{(2)}$.

The first set of feature maps 306 comprises feature maps that are generated following a convolution of a respectively a first modality of an image 320, a second modality of an image 322, a nth modality of an image 324 by respectively a plurality of convolution kernels. In this embodiment, each plurality of convolution kernels comprises 48 convolution kernels, each having a size of (5,5).

The second set of feature maps 308 comprises feature maps that are generated following a convolution of each set of features maps with a corresponding set of convolution kernels. As outlined above, it will be appreciated that each convolution operation is followed by a ReLU operation to produce the feature map. This applies everywhere, except in the combining unit. In this instance, the max-pooling operation disclosed below follows the ReLU. More precisely and in this embodiment, each plurality of convolution kernels comprises 48 convolution kernels, each having a size of (5,5) and a pooling (2,2) stride 1. It will be appreciated that a max-pooling operation is applied to each feature map immediately after the ReLU operation. This operation has a pooling window of 2×2, and a stride of one in one embodiment. This means that all 2×2 regions in the feature map are visited, and the maximum value within each region is taken, hence the name "max-pooling", to yield one value per 2×2 region. A stride of "one" means that we move by one pixel, independently in the horizontal and vertical directions, such that there are as many pixels at output as there are at input. In addition, to ensure that the right number of pixels is obtained, there is zero-padding at the edges around each feature map. The purpose of this kind of max-pooling is to introduce some robustness in the location of the features identified by the convolution kernels.

The combining unit 302 comprises a first plurality of feature maps 310 and a second plurality of feature maps 312.

The first plurality of feature maps 310 corresponds to an arithmetic average of the corresponding feature maps, while the second plurality of feature maps 312 comprises a variance of a plurality of incoming feature maps.

More precisely, modality fusion is computed here, as first and second moments across available modalities in $C^{(2)}$, separately for each feature map I.

$$E_l[C^{(2)}] = \frac{1}{|K|}\sum_{k \in K} C_{k,l}^{(2)}$$

$$[] - \sum_{||} (^0 [])$$

with $Var_l[C^{(2)}]$ defined to be zero if $|K|=1$.

The second group of kernels 304 comprises at least one layer of convolution kernels.

In the embodiment shown in FIG. 3, two layers of a plurality of convolution kernels are provided.

A first layer of a plurality of convolution kernels is used for generating a first plurality of feature maps 314.

The first layer of a plurality of convolution kernels comprises 16 kernels having a size of (5,5). The skilled addressee will appreciate that various alternative embodiments may be provided for the number of the convolution kernels as well as for the size of each convolution kernel.

A second layer of a plurality of convolution kernels is used for generating the second plurality of feature maps 316.

It will be appreciated that the last layer of the second group of kernels 304, i.e. the second layer of a plurality of a plurality of convolution kernels in this embodiment, comprises a number of kernels equal to a number of classes. It will be appreciated that the number of classes represents the types of segments that we want to produce. In a simple case, two classes are provided, e.g., "tumour" and "non-tumour". In more complex cases, we may have tumour subtypes that depend on texture characteristics of the image, and those would correspond to additional classes. It will be appreciated that in this embodiment the size of each convolution kernel of the second layer of convolution kernels is (21,21). The skilled addressee will appreciate that various alternative embodiments may be provided for the size of the convolution kernels.

More precisely and in the embodiment disclosed in FIG. 3, the second group of kernels 304 combines the merged modalities to produce the final model output.

All $E[C^{(2)}]$ and $Var[C^{(2)}]$ feature maps are concatenated and are passed through a convolutional filter $C^{(3)}$ with ReLU activation, to finish with a final layer $C^{(4)}$ that has as many feature maps as there are target segmentation classes.

In one embodiment, the pixelwise posterior class probabilities are given by applying a softmax function across the $C^{(4)}$ feature maps, and a full segmentation is obtained by taking the pixelwise most likely posterior class in the feature map processing unit.

According to processing step 104, the segmentation unit is trained.

It will be appreciated that the segmentation unit may be trained according to various embodiments.

In one embodiment, the segmentation unit is trained using a back propagation algorithm.

As it is known to the skilled addressee, many algorithms may be used to train the segmentation unit.

In one embodiment, the training starts with easiest situations before having to learn the difficult ones.

For instance the training is started with a pseudo-curriculum learning scheme where after a few iterations where all modalities are presented to the segmentation unit, modalities are randomly dropped, ensuring a higher probability of dropping zero or one modality only.

Typically a number of several hundreds to tens of thousands instances may be used to train the segmentation unit.

Still referring to FIG. 1 and according to processing step 106, the segmentation unit is used. It will be appreciated that the segmentation unit may be used according to various embodiments.

In fact, it will be appreciated that the segmentation unit may be used using a set of at least one modality of an image.

It will be appreciated that the set of at least one modality of an image may be provided according to various embodiments.

Figure 4:
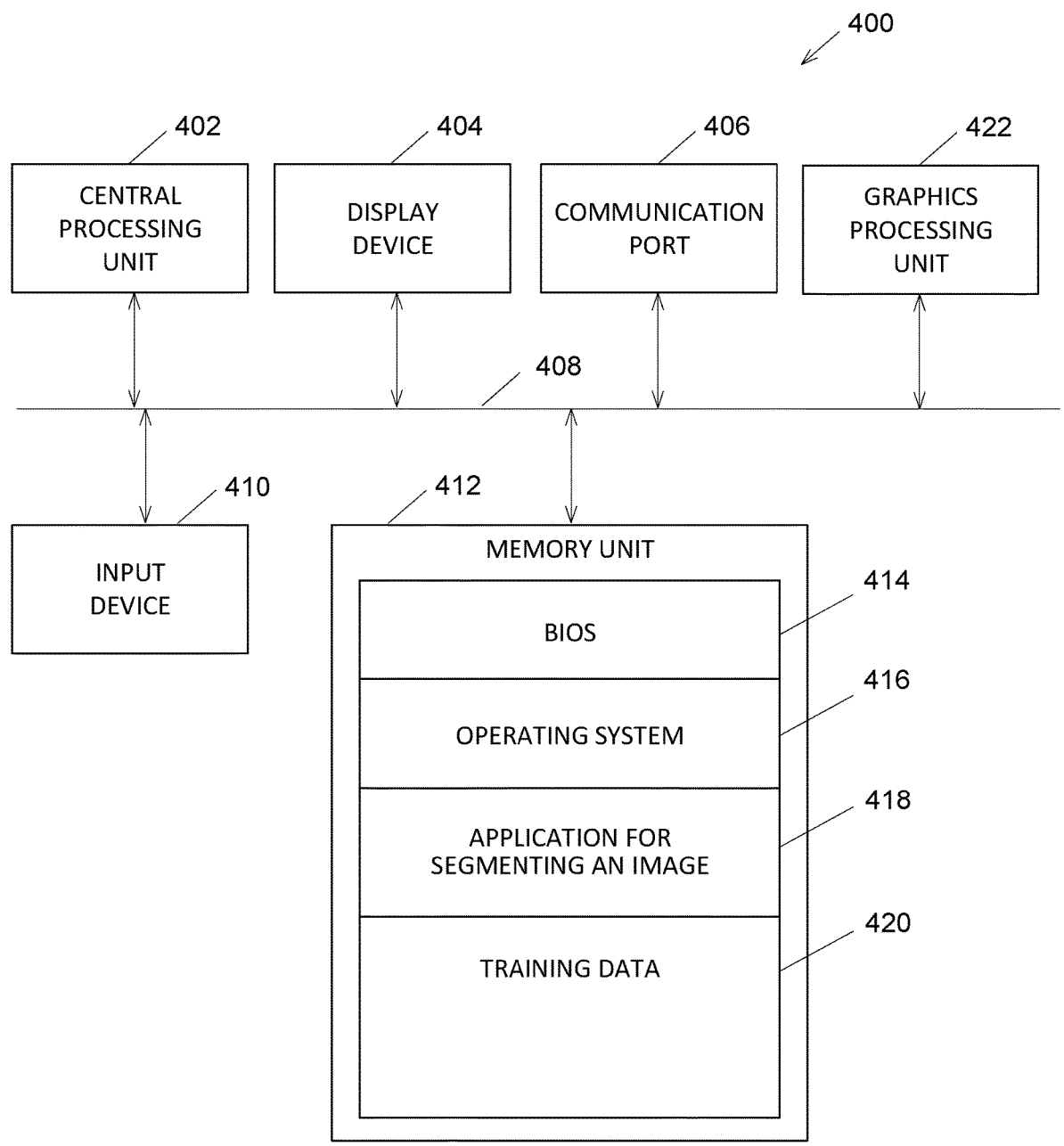
FIG. 4 is a diagram that shows an embodiment of a processing device that may be used for implementing the method for processing a task wherein the processing of the task comprises segmenting an image.

Now referring to FIG. 4, there is shown an embodiment of a processing device for segmenting an image 400.

It will be appreciated that the processing device for segmenting an image 400 is an embodiment of a processing device for processing a task wherein the processing of the task comprises segmenting an image.

The processing device for segmenting an image 400 comprises a central processing unit 402, a display device 404, input devices 410, communication ports 406, a data bus 408, a memory unit 412 and a graphics processing unit (GPU) 422.

The central processing unit 402, the display device 404, the input devices 410, the communication ports 406, the memory unit 412 and the graphics processing unit 422 are interconnected using the data bus 408.

The central processing unit 402 is used for processing computer instructions. The skilled addressee will appreciate that various embodiments of the central processing unit 402 may be provided.

In one embodiment, the central processing unit 402 is a CPU Core i7 CPU running at 3.4 GHz and manufactured by Inter™.

In one embodiment, the graphics processing unit 422 is a Titan X GPU manufactured by Nvidia™.

The display device 404 is used for displaying data to a user. The skilled addressee will appreciate that various types of display device 404 may be used.

In one embodiment, the display device 404 is a standard liquid-crystal display (LCD) monitor.

The communication ports 406 are used for sharing data with the processing device for segmenting an image 400.

The communication ports 406 may comprise, for instance, a universal serial bus (USB) port for connecting a keyboard and a mouse to the processing device for segmenting an image 400.

The communication ports 406 may further comprise a data network communication port such as an IEEE 802.3 port for enabling a connection of the processing device for segmenting an image 400 with another processing device via a data network, not shown.

The skilled addressee will appreciate that various alternative embodiments of the communication ports 406 may be provided.

In one embodiment, the communication ports 406 comprise an Ethernet port and a mouse port (e.g., Logitech™).

The memory unit 412 is used for storing computer-executable instructions.

It will be appreciated that the memory unit 412 comprises, in one embodiment, a basic input/output system, also referred to as bios 414.

The memory unit 412 further comprises an operating system 416.

It will be appreciated by the skilled addressee that the operating system 416 may be of various types.

In an embodiment, the operating system 416 is Linux Ubuntu operating system version 15.10 or more recent.

The memory unit 412 further comprises an application for segmenting an image 418. It will be appreciated that the application for segmenting an image 418 is an embodiment of an application for processing a task, wherein the processing of the task comprises segmenting an image.

The memory unit 412 further comprises training data 420.

It will be appreciated that the training data 420 are used for training a segmentation unit implemented in the application for segmenting an image 418.

In an alternative embodiment, the memory unit 412 does not comprise the training data 420. It will be appreciated that this is the case when the segmentation unit has been already fully trained.

The application for segmenting an image 418 comprises instructions for providing a segmentation unit for generating a segmentation mask of an image, the segmentation unit comprising a first group of convolution kernels comprising at least one layer of convolution kernels, each layer comprising more than one set of a plurality of convolution kernels to be trained; each set for receiving a specific modality of the image and for generating a plurality of corresponding feature maps; a combining unit for combining, for each convolution kernel to be trained of the plurality of convolution kernels to be trained, each feature map generated by a given convolution kernel to be trained in each set of the more than one set a plurality of convolution kernels to be trained to thereby provide a plurality of corresponding combined feature maps; and a second group of convolution kernels comprising at least one layer of convolution kernels, each layer comprising a set of a plurality of convolution kernels to be trained; each set of a plurality of convolution kernels to be trained for receiving a corresponding combined feature map generated by the combining unit and for generating the segmentation mask of the image.

In the case where the segmentation unit is not fully trained, the application for segmenting an image 418 comprises instructions for training each convolution kernels of the segmentation unit using training data.

The application for segmenting an image 418 further comprises instructions for providing at least one modality of the image to segment to the segmentation unit.

The application for segmenting an image 418 further comprises instructions for providing a corresponding segmentation mask of the image to segment.

It will be appreciated that the application for segmenting an image 418 is an embodiment of an application for processing a task. The application for processing a task comprises instructions for providing a unit for generating a vector of at least one numeric value to be used for processing a task, the unit for generating a vector of at least one numeric value to be used for processing a task comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed; and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed; and a feature map processing unit for receiving the generated at least one final feature map from the second feature map generating unit and for processing the generated at least one final feature map to provide a generated a vector of at least one numeric value to be used for processing the task. The application for processing a task further comprises instructions for training the unit for generating combined feature maps and the second feature map generating unit using training data. The application for processing a task further comprises instructions for providing at least one modality to the unit for generating a vector of at least one numeric value to be used for processing the task and instructions for obtaining a corresponding vector of at least one numeric value.

It will be appreciated that a non-transitory computer-readable storage medium is also disclosed for storing computer-executable instructions which, when executed, cause a processing device to perform a method for segmenting an image, the method comprising providing a trained segmentation unit for generating a segmentation mask of an image, the segmentation unit comprising a first group of convolution kernels comprising at least one layer of convolution kernels, each layer comprising more than one set of a plurality of convolution kernels; each set for receiving a specific modality of the image and for generating a plurality of corresponding feature maps; a combining unit for combining, for each convolution kernel of the plurality of convolution kernels, each feature map generated by a given convolution kernel in each set of the more than one set a plurality of convolution kernels to thereby provide a plurality of corresponding combined feature maps; and a second group of convolution kernels comprising at least one layer of convolution kernels, each layer comprising a set of a plurality of convolution kernels; each set of a plurality of convolution kernels for receiving a corresponding combined feature map generated by the combining unit and for generating the segmentation mask of the image; providing at least one modality of the image to segment to the segmentation and providing a corresponding segmentation mask of the image.

It will be appreciated that a non-transitory computer-readable storage medium is also disclosed for storing computer-executable instructions which, when executed, cause a processing device to perform a method for processing a task, the method comprising providing a unit for generating a vector of at least one numeric value to be used for processing a task, the unit for generating a vector of at least one numeric value to be used for processing a task comprising a unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined featured maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed, and a feature map processing unit for receiving the generated at least one final feature map from the second feature map generating unit and for processing the generated at least one final feature map to provide a generated vector of at least one numeric value to be used for processing the task; training the unit for generating combined feature maps and the second feature map generating unit using training data; providing at least one modality to the unit for generating a vector of at least one numeric value to be used for processing a task and obtaining a corresponding vector of at least one numeric value.

It will be appreciated that a non-transitory computer-readable storage medium is also disclosed for storing computer-executable instructions which, when executed, cause a processing device to perform a method for segmenting an image, the method comprising providing a segmentation unit for generating a segmentation mask of an image, the segmentation unit comprising a first group of convolution kernels comprising at least one layer of convolution kernels, each layer comprising more than one set of a plurality of convolution kernels to be trained; each set for receiving a specific modality of the image and for generating a plurality of corresponding feature maps; a combining unit for combining, for each convolution kernel to be trained of the plurality of convolution kernels to be trained, each feature map generated by a given convolution kernel to be trained in each set of the more than one set a plurality of convolution kernels to be trained to thereby provide a plurality of corresponding combined feature maps; and a second group of convolution kernels comprising at least one layer of convolution kernels, each layer comprising a set of a plurality of convolution kernels to be trained; each set of a plurality of convolution kernels to be trained for receiving a corresponding combined feature map generated by the combining unit and for generating the segmentation mask of the image; training each convolution kernels using training data; providing at least one modality of the image to segment to the segmentation; providing a corresponding segmentation mask of the image.

It will be also appreciated that that a non-transitory computer-readable storage medium is disclosed for storing computer-executable instructions which, when executed, cause a processing device to perform a method for performing a task, the method comprising providing a trained unit for generating a vector of at least one numeric value to be used for processing a task, the unit for generating a vector of at least one numeric value to be used for processing a task comprising: a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed; and a feature map processing unit for receiving the generated at least one final feature map from the second feature map generating unit and for processing the generated at least one final feature map to provide a generated vector of at least one numeric value to be used for processing the task; providing at least one modality to the trained unit for generating a vector of at least one numeric value to be used for processing the task and obtaining a corresponding vector of at least one numeric value.

It will be appreciated that the segmentation unit disclosed herein learns, for each modality of an image, an embedding of the image into an abstraction layer space. In this latent space, arithmetic operations, such as computing first and second moments, are well defined and can be taken over the different modalities available at inference time. This higher level features space can then be further processed to estimate the segmentation.

A method for processing a plurality of modalities is also disclosed. In this method, the processing is robust to an absence of at least one modality. The method comprises receiving a plurality of modalities. The method further comprises processing each modality of the plurality of modalities using a respective transformation to generate a respective feature map comprising at least one corresponding numeric value, wherein the respective transformation operates independently of each other, further wherein the respective transformation comprises a machine learning model composed of at least a plurality of levels of non-linear operations. The method further comprises processing the numeric values obtained using at least one combining operation to generate at least one combined representation of the numeric values obtained, wherein the at least one combining operation comprises a computation that reduces each corresponding numeric value of each of the more than one feature maps generated down to a numeric value in the at least one combined representation of the numeric values obtained. Finally, the method comprises processing the at least one combined representation of the numeric values obtained using a machine learning model composed of at least one level of at least one of a nonlinear operation and a linear operation for performing the processing of the plurality of modalities.

An advantage of the method for processing a task disclosed herein is that it is robust to any combinatorial subset of available modalities provided as input, without the need to learn a combinatorial number of imputation models.

Although the above description relates to a specific preferred embodiment as presently contemplated by the inventor, it will be understood that the invention in its broad aspect includes functional equivalents of the elements described herein.

Clause 1. A unit for generating a vector of at least one numeric value to be used for processing a task, the unit for generating a vector comprising:

a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map;

a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the processing task to be performed; and a feature map processing unit for receiving the generated at least one final feature map from the second feature map generating unit and for processing the generated at least one final feature map to provide a generated vector of at least one numeric value to be used for processing the task.

Clause 2. The unit for generating combined feature maps as claimed in clause 1, wherein the initial training is performed according to a pseudo-curriculum learning scheme wherein after a few iterations where all modalities are presented, modalities are randomly dropped.

Clause 3. The unit for generating combined feature maps as claimed in clause 1, wherein each of the more than one corresponding transformation comprises a machine learning model composed of at least a plurality of levels of non-linear operations.

Clause 4. The unit for generating combined feature maps as claimed in clause 1, wherein each of the more than one corresponding transformation comprises more than one layer of convolutional neural networks followed by fully connected layers.

Clause 5. The unit for generating combined feature maps as claimed in clause 1, wherein each of the generated more than one corresponding feature map is represented using one of a polynomial, a radial basis function, and a sigmoid kernel.

Clause 6. The unit for generating combined feature maps as claimed in clause 1, wherein the processing task to be performed comprises an image processing task selected from a group consisting of an image segmentation, an image classification, an image detection, a pixel-wise classification and a detection of patches in images.

Clause 7. The unit for generating a vector of at least one numeric value to be used for processing a task as claimed in clause 1, wherein each of the at least one corresponding transformation of the second feature map generating unit comprises a machine learning model composed of at least one level of at least one of a non-linear operation and a linear operation.

Clause 8. A non-transitory computer-readable storage medium for storing computer-executable instructions which, when executed, cause a processing device to perform a method for processing a task, the method comprising:

providing a unit for generating a vector of at least one numeric value to be used for processing a task, the unit for generating a vector of at least one numeric value to be used for processing a task comprising:

a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined featured maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed, and a feature map processing unit for receiving the generated at least one final feature map from the second feature map generating unit and for processing the generated at least one final feature map to provide a generated vector of at least one numeric value to be used for processing the task;

training the unit for generating combined feature maps and the second feature map generating unit using training data;

providing at least one modality to the unit for generating a vector of at least one numeric value to be used for processing a task; and obtaining a corresponding vector of at least one numeric value.

Clause 9. A non-transitory computer-readable storage medium for storing computer-executable instructions which, when executed, cause a processing device to perform a method for performing a task, the method comprising:

providing a trained unit for generating a vector of at least one numeric value to be used for processing a task, the unit for generating a vector of at least one numeric value to be used for processing a task comprising:

a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed; and a feature map processing unit for receiving the generated at least one final feature map from the second feature map generating unit and for processing the generated at least one final feature map to provide a generated vector of at least one numeric value to be used for processing the task;

providing at least one modality to the trained unit for generating a vector of at least one numeric value to be used for processing the task;

obtaining a corresponding vector of at least one numeric value.

Clause 10. A processing device comprising:
a central processing unit;
a display device;

a communication port for operatively connecting the processing device to a plurality of mobile processing devices, each carried by a user;

a memory unit comprising an application for processing a task, the application comprising:

instructions for providing a unit for generating a vector of at least one numeric value to be used for processing a task, the unit for generating a vector of at least one numeric value to be used for processing a task comprising a unit for generating combined feature maps, the unit for generating combined feature maps comprising a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map, a second feature map generating unit, the second feature map generating unit for receiving the at least one corresponding combined feature map from the unit for generating combined feature maps and for generating at least one final feature map using at least one corresponding transformation; wherein the generating of the at least one final feature map is performed by applying each of the at least one corresponding transformation on at least one of the at least one corresponding feature map received from the unit for generating combined feature maps; wherein the at least one corresponding transformation is generated following an initial training performed in accordance with the task to be performed; and a feature map processing unit for receiving the generated at least one final feature map from the second feature map generating unit and for processing the generated at least one final feature map to provide a generated a vector of at least one numeric value to be used for processing the task;

instructions for training the unit for generating combined feature maps and the second feature map generating unit using training data;

instructions for providing at least one modality to the unit for generating a vector of at least one numeric value to be used for processing the task; and instructions for obtaining a corresponding vector of at least one numeric value.

Clause 11. A method for processing a plurality of modalities, wherein the processing is robust to an absence of at least one modality, the method comprising:

receiving a plurality of modalities;

processing each modality of the plurality of modalities using a respective transformation to generate a respective feature map comprising at least one corresponding numeric value, wherein the respective transformation operates independently of each other, further wherein the respective transformation comprises a machine learning model composed of at least a plurality of levels of non-linear operations;

processing the numeric values obtained using at least one combining operation to generate at least one combined representation of the numeric values obtained, wherein the at least one combining operation comprises a computation that reduces each corresponding numeric value of each of the more than one feature maps generated down to a numeric value in the at least one combined representation of the numeric values obtained; and processing the at least one combined representation of the numeric values obtained using a machine learning model composed of at least one level of at least one of a nonlinear operation and a linear operation for performing the processing of the plurality of modalities.

Clause 12. A unit for generating combined feature maps in accordance with a processing task to be performed, the unit for generating combined feature maps comprising:

a feature map generating unit, the feature map generating unit for receiving more than one modality and for generating more than one corresponding feature map using more than one corresponding transformation operating independently of each other; wherein the generating of each of the more than one corresponding feature map is performed by applying a given corresponding transformation on a given corresponding modality, wherein the more than one corresponding transformation is generated following an initial training performed in accordance with the processing task to be performed; and a combining unit for selecting and combining the corresponding more than one feature map generated by the feature map generating unit in accordance with at least one combining operation and for providing at least one corresponding combined feature map; wherein the combining unit is operating in accordance with the processing task to be performed and the combining operation reduces each corresponding numeric value of each of the more than one feature map generated by the feature map generation unit down to one numeric value in the at least one corresponding combined feature map.

Clause 13. The unit for generating combined feature maps as claimed in clause 1, wherein the combining of the corresponding more than one feature map generated by the feature map generating unit is performing in accordance with more than one combining operation; wherein each combining operation is independent from one another.

REFERENCES

1. Bengio, Y., Louradour, J., Collobert, R., Weston, J.: Curriculum learning. In: Proceedings of the 26th annual international conference on machine learning. pp. 41-48. ACM (2009)
2. Brosch, T., Yoo, Y., Tang, L. Y. W., Li, D. K. B., Traboulsee, A., Tam, R.: Medical Image Computing and Compute-Assisted Intervention—MICCAI 2015: 18th International Conference, Munich, Germany, Oct. 5-9, 2015, Proceedings, Part III, chap. Deep Convolutional Encoder Networks for Multiple Sclerosis Lesion Segmentation, pp. 3-11. Springer International Publishing, Cham (2015)
3. Chollet, F.: keras. https://github.com/fchollet/keras (2015)

4. Cordier, N., Delingette, H., Ayache, N.: A patch-based approach for the segmentation of pathologies: Application to glioma labelling. IEEE Transactions on Medical Imaging PP(99), 1-1 (2016)
5. Geremia, E., Menze, B. H., Ayache, N.: Spatially adaptive random forests pp. 1344-1347 (2013)
6. Goodfellow, I., Bengio, Y., Courville, A.: Deep learning (2016), http://goodfeli.github.io/dlbook/, book in preparation for MIT Press
7. Guizard, N., Coupé, P., Fonov, V. S., Manjón, J. V., Arnold, D. L., Collins, D. L.: Rotation-invariant multi-contrast non-local means for ms lesion segmentation. NeuroImage: Clinical 8, 376-389 (2015)
8. Havaei, M., Davy, A., Warde-Farley, D., Biard, A., Courville, A., Bengio, Y., Pal, C., Jodoin, P. M., Larochelle, H.: Brain tumor segmentation with deep neural networks. arXiv preprint arXiv:1505.03540 (2015)
9. Hofmann, M., Steinke, F., Scheel, V., Charpiat, G., Farquhar, J., Aschoff, P., Brady, M., Schölkopf, B., Pichler, B. J.: MRI-based attenuation correction for PET/MRI: a novel approach combining pattern recognition and atlas registration. Journal of Nuclear Medicine 49(11), 1875-1883 (2008)
10. Hor, S., Moradi, M.: Scandent tree: A random forest learning method for incomplete multimodal datasets. In: Medical Image Computing and Computer-Assisted Intervention—MICCAI 2015, pp. 694-701. Springer (2015)
11. Iglesias, J. E., Sabuncu, M. R.: Multi-atlas segmentation of biomedical images: A survey. Medical image analysis 24(1), 205-219 (2015)
12. Long, J., Shelhamer, E., Darrell, T.: Fully convolutional networks for semantic segmentation. In: Proceedings of the IEEE Conference on Computer Vision and Pattern Recognition. pp. 3431-3440 (2015)
13. Menze, B., Jakab, A., Bauer, S., Kalpathy-Cramer, J., Farahani, K., Kirby, J.e.a.: The multimodal brain tumor image segmentation benchmark (brats). Medical Imaging, IEEE Transactions on 34(10), 1993-2024 (October 2015)
14. Mikolov, T., Sutskever, I., Chen, K., Corrado, G. S., Dean, J.: Distributed representations of words and phrases and their compositionality. In: Advances in neural information processing systems. pp. 3111-3119 (2013)
15. Sled, J. G., Zijdenbos, A. P., Evans, A. C.: A nonparametric method for automatic correction of intensity non-uniformity in mri data. Medical Imaging, IEEE Transactions on 17(1), 87-97 (1998)
16. Souplet, J., Lebrun, C., Ayache, N., Malandain, G.: An automatic segmentation of T2-FLAIR multiple sclerosis lesions (July 2008)
17. Srivastava, N., Hinton, G., Krizhevsky, A., Sutskever, I., Salakhutdinov, R.: Dropout: A simple way to prevent neural networks from overfitting. The Journal of Machine Learning Research 15(1), 1929-1958 (2014)
18. Styner, M., Lee, J., Chin, B., Chin, M., Commowick, O., Tran, H., Markovic-Plese, S., Jewells, V., Warfield, S.: 3d segmentation in the clinic: A grand challenge ii: Ms lesion segmentation. MIDAS Journal 2008, 1-6 (2008)
19. Sutskever, I., Martens, J., Dahl, G., Hinton, G.: On the importance of initialization and momentum in deep learning. In: Proceedings of the 30th international conference on machine learning (ICML-13). pp. 1139-1147 (2013)
20. Sutskever, I., Vinyals, O., Le, Q. V.: Sequence to sequence learning with neural networks. In: Advances in neural information processing systems. pp. 3104-3112 (2014)
21. Tulder, G., Bruijne, M.: Medical Image Computing and Computer-Assisted Intervention—MICCAI 2015: 18th International Conference, Munich, Germany, Oct. 5-9, 2015, Proceedings, Part I, chap. Why Does Synthesized Data Improve Multi-sequence Classification?, pp. 531-538. Springer International Publishing, Cham (2015)
22. Tustison, N. J., Shrinidhi, K., Wintermark, M., Durst, C. R., Kandel, B. M., Gee, J. C., Grossman, M. C., Avants, B. B.: Optimal symmetric multimodal templates and concatenated random forests for supervised brain tumor segmentation (simplified) with antsr. Neuroinformatics 13(2), 209-225 (2015)
23. Van Buuren, S.: Flexible imputation of missing data. CRC press (2012)
24. Vincent, P., Larochelle, H., Bengio, Y., Manzagol, P. A.: Extracting and composing robust features with denoising autoencoders. In: Proceedings of the 25th international conference on Machine learning. pp. 1096-1103. ACM (2008)
25. Xu, K., Ba, J., Kiros, R., Cho, K., Courville, A., Salakhudinov, R., Zemel, R., Ben-gio, Y.: Show, attend and tell: Neural image caption generation with visual attention. In: Blei, D., Bach, F. (eds.) Proceedings of the 32nd International Conference on Machine Learning (ICML-15). pp. 2048-2057. JMLR Workshop and Conference Proceedings (2015), http://jmlr.org/proceedings/papers/v37/xuc15.pdf
26. Zhao, L., Wu, W., Corso, J. J.: Medical Image Computing and Computer-Assisted Intervention—MICCAI 2013: 16th International Conference, Nagoya, Japan, Sep. 22-26, 2013, Proceedings, Part III, chap. Semi-automatic Brain Tumor Segmentation by Constrained MRFs Using Structural Trajectories, pp. 567-575. Springer Berlin Heidelberg, Berlin, Heidelberg (2013), http://dx.doi.org/10.1007/978-3-642-40760-4_71

The invention claimed is:

1. A system for generating a vector of at least one numeric value to be used for processing a task, the system comprising:
one or more processors configured to:
receive information captured from more than one modality,
for each of the more than one modality, following an initial training performed in accordance with a processing task to be performed,
generate a feature map corresponding to the received information captured from the modality by applying at least one transformation corresponding to the modality on the information captured from the modality, wherein each of the feature maps is generated independently of each other; wherein the generating of each of the more than one corresponding feature map is performed by applying a given corresponding transformation on a given corresponding modality, and wherein the more than one corresponding transformation is generated following the initial training performed in accordance with the processing task to be performed;
in accordance with the processing task to be performed, select and combine the generated feature maps in accordance with at least one combining operation to generate at least one corresponding combined feature map by, for each generated feature map, reducing numeric values of the generated feature map, reducing numeric values of the generated feature map to a single numeric value of the at least one corresponding combined feature map;
generate at least one final feature map by applying each of at least one final transformation on at least one of the at least one corresponding combined feature map; wherein the at least one final feature map is generated following the initial training performed in accordance with the processing task to be performed; and process the generated at least one final feature map to provide a generated vector of at least one numeric value to be used for processing the task.

2. The system for generating combined feature maps as claimed in claim 1, wherein the initial training is performed according to a pseudo-curriculum learning scheme wherein after a few iterations where all modalities are presented, modalities are randomly dropped.

3. The system for generating combined feature maps as claimed in claim 1, wherein each of the more than one corresponding transformation comprises a machine learning model composed of at least a plurality of levels of non-linear operations.

4. The system for generating combined feature maps as claimed in claim 1, wherein each of the more than one corresponding transformation comprises more than one layer of convolutional neural networks followed by fully connected layers.

5. The system for generating combined feature maps as claimed in claim 1, wherein each of the generated more than one corresponding feature map is represented using one of a polynomial, a radial basis function, and a sigmoid kernel.

6. The system for generating combined feature maps as claimed in claim 1, wherein the processing task to be performed comprises an image processing task selected from a group consisting of an image segmentation, an image classification, an image detection, a pixel-wise classification and a detection of patches in images.

7. The system for generating a vector of at least one numeric value to be used for processing a task as claimed in claim 1, wherein each of the at least one corresponding transformation of the second feature map generating unit comprises a machine learning model composed of at least one level of at least one of a non-linear operation and a linear operation.

8. A non-transitory computer-readable storage medium for storing computer-executable instructions which, when executed, cause a processing device to perform a method for processing a task, the method comprising:
providing at least one numeric value to be used for processing a task,
receiving information captured from more than one modality,
for each of the more than one modality, following an initial training performed in accordance with a processing task to be performed, generating a feature map corresponding to the received information captured from the modality by applying at least one transformation corresponding to the modality on the information captured from the modality, wherein each of the feature maps are generated independently of each other; wherein the generating of each of the more than one corresponding feature map is performed by applying a given corresponding transformation on a given corresponding modality, wherein the more than one corresponding transformation is generated following the initial training performed in accordance with the processing task to be performed;
in accordance with the processing task to be performed:
selecting and combining the generated feature maps in accordance with at least one combining operation to generate at least one corresponding combined feature map by, for each generated feature map, reducing numeric values of the generated feature map, reducing numeric values of the generated feature map to a single numeric value of the at least one corresponding combined feature map;
generating at least one final feature map by applying each of at least one final transformation on at least one of the at least one corresponding combined feature map; wherein the at least one final feature map is generated following the initial training performed in accordance with the task to be performed, and
processing the generated at least one final feature map to provide a generated vector of at least one numeric value to be used for processing the task.

9. A non-transitory computer-readable storage medium for storing computer-executable instructions which, when executed, cause a processing device to perform a method for performing a task, the method comprising:
providing at least one numeric value to be used for processing a task,
receiving information captured from more than one modality,
for each of the more than one modality, following an initial training performed in accordance with a processing task to be performed, generating a feature map corresponding to the received information captured from the modality by applying at least one transformation corresponding to the modality on the information captured from the modality, wherein each of the feature maps are generated independently of each other; wherein the generating of each of the more than one corresponding feature map is performed by applying a given corresponding transformation on a given corresponding modality, and wherein the more than one corresponding transformation is generated following the initial training performed in accordance with the processing task to be performed;
in accordance with the processing task to be performed, selecting and combining the generated feature maps in accordance with at least one combining operation to generate at least one corresponding combined feature map by, for each generated feature map, reducing numeric values of the generated feature map, reducing numeric values of the generated feature map to a single numeric value of the at least one corresponding combined feature map;
generating at least one final feature map by applying each of at least one final transformation on at least one of the at least one corresponding combined feature map; wherein the at least one final feature map is generated following the initial training performed in accordance with the task to be performed; and
processing the generated at least one final feature map to provide a generated vector of at least one numeric value to be used for processing the task.

10. A processing device comprising:
a central processing unit;
a display device;
a communication port for operatively connecting the processing device to a plurality of mobile processing devices, each carried by a user;
a memory unit comprising an application for processing a task, the application comprising instructions for:
providing at least one numeric value to be used for processing a task,
receiving information captured from more than one modality, for each of the more than one modality, following an initial training performed in accordance with a processing task to be performed, generating a feature map corresponding to the received information captured from the modality by applying at least one transformation corresponding to the modality on the information captured from the modality, wherein each of the feature maps is generated independently of each other; wherein the generating of each of the more than one corresponding feature map is performed by applying a given corresponding transformation on a given corresponding modality, and wherein the more than one corresponding transformation is generated following the initial training performed in accordance with the processing task to be performed;

in accordance with the processing task to be performed, selecting and combining the generated feature maps in accordance with at least one combining operation to generate at least one corresponding combined feature map by, for each generated feature map, reducing numeric values of the generated feature map, reducing numeric values of the generated feature map to a single numeric value of the at least one corresponding combined feature map;

generating combined feature maps and generating at least one final feature map by applying each of at least one final transformation on at least one of the at least one corresponding combined feature map; wherein the at least one final feature map is generated following the initial training performed in accordance with the task to be performed; and processing the generated at least one final feature map to provide a generated a vector of at least one numeric value to be used for processing the task.

11. A method for processing a plurality of modalities, wherein the processing is robust to an absence of at least one modality, the method comprising:

receiving information captured from a plurality of modalities;

for each of the more than one modality, following an initial training performed in accordance with a processing task to be performed, generating a feature map corresponding to the received information captured from the modality by applying at least one transformation corresponding to the modality on the information captured from the modality, wherein each of the feature maps is generated independently of each other, each generated feature map comprising at least one corresponding numeric value, further wherein the generating of each of the more than one corresponding feature map is performed by applying a given corresponding transformation on a given corresponding modality, and each given corresponding transformation comprises a machine learning model composed of at least a plurality of levels of non-linear operations;

processing the numeric values of the generated feature maps using at least one combining operation to generate at least one combined representation of the numeric values of the generated feature maps, wherein the at least one combining operation comprises, for each generated combined representation, a computation that reduces each corresponding numeric value of each of the generated feature maps to a single numeric value in the at least one combined representation of the numeric values obtained; and processing the at least one combined representation of the numeric values obtained using a machine learning model composed of at least one level of at least one of a nonlinear operation and a linear operation for performing the processing of the plurality of modalities.

12. A system for generating combined feature maps in accordance with a processing task to be performed, the system comprising:

one or more processors configured to:

receive information captured from more than one modality, for each of the more than one modality, following an initial training performed in accordance with a processing task to be performed, generate a feature map corresponding to the received information captured from the modality by applying at least one transformation corresponding to the modality on the information captured from the modality, wherein each of the feature maps are generated independently of each other; wherein the generating of each of the more than one corresponding feature map is performed by applying a given corresponding transformation on a given corresponding modality, and wherein the more than one corresponding transformation is generated following the initial training performed in accordance with the processing task to be performed;

in accordance with the processing task to be performed, select and combine the corresponding more than one generated feature maps in accordance with at least one combining operation to generate at least one corresponding combined feature map by, for each generated feature map, reducing numeric values of the generated feature map, reducing numeric values of the generated feature map to a single numeric value of the at least one corresponding combined feature map.

13. The system for generating combined feature maps as claimed in claim 1, wherein the combining of the corresponding more than one generated feature map is performed in accordance with more than one combining operation; wherein each combining operation is independent from one another.

* * * * *